United States Patent
Dunn (10) Patent No.: US 10,723,185 B2
(45) Date of Patent: Jul. 28, 2020

(54) APPARATUS FOR SEATING THE BEAD OF A TUBELESS TIRE ONTO A RIM

(71) Applicant: Patrick Michael Dunn, Harrisonville, NJ (US)

(72) Inventor: Patrick Michael Dunn, Harrisonville, NJ (US)

(*) Notice: Subject to any disclaimer, the term of this patent is extended or adjusted under 35 U.S.C. 154(b) by 198 days.

(21) Appl. No.: 15/901,454

(22) Filed: Feb. 21, 2018

(65) Prior Publication Data
US 2018/0236830 A1 Aug. 23, 2018

Related U.S. Application Data

(60) Provisional application No. 62/461,386, filed on Feb. 21, 2017.

(51) Int. Cl.
*B60C 25/14* (2006.01)
(52) U.S. Cl.
CPC .................... *B60C 25/14* (2013.01)
(58) Field of Classification Search
CPC ........ B60C 25/00; B60C 25/14; B60C 25/145
USPC ...................... 81/64; 269/130–132
See application file for complete search history.

(56) References Cited

U.S. PATENT DOCUMENTS

| | | | |
|---|---|---|---|
| 2,607,092 A * | 8/1952 | Rubly ..................... | F16L 33/08 24/274 R |
| 2,684,112 A | 7/1954 | Coats | |
| 2,778,415 A | 1/1957 | Murray | |
| 2,799,328 A | 7/1957 | Pitman | |
| 2,835,319 A | 5/1958 | Fleming, Jr. | |
| 2,859,805 A | 11/1958 | Burdette | |
| 2,871,929 A | 2/1959 | Butler et al. | |
| 2,886,099 A | 5/1959 | Bishman | |
| 2,897,881 A | 8/1959 | Bishman | |
| 2,907,380 A | 10/1959 | McCaskill | |
| 2,918,965 A | 12/1959 | Merriman | |
| 3,070,056 A * | 12/1962 | Hill ..................... | F16L 55/1705 269/131 |
| 3,096,760 A * | 7/1963 | Nelkin ................... | A61F 5/028 128/95.1 |
| 3,241,593 A | 3/1966 | Lien | |
| 3,305,903 A | 2/1967 | McMahon | |
| 3,480,067 A | 11/1969 | Iglewitz | |
| 3,515,198 A | 6/1970 | Iglewitz | |
| 3,578,059 A | 5/1971 | Uhen et al. | |
| 3,599,699 A | 8/1971 | Middleton, Jr. | |
| 3,599,700 A | 8/1971 | Cutillo | |
| 3,974,005 A * | 8/1976 | Graml .................. | B60C 25/145 157/1.1 |

(Continued)

*Primary Examiner* — David B. Thomas
(74) *Attorney, Agent, or Firm* — Mendelsohn Dunleavy, P.C.

(57) ABSTRACT

A flexible compression apparatus for seating the bead of a tubeless tire onto a rim and a method of using the apparatus. The flexible compression including: a circular spiral flexible band having a first terminal edge wound on an exterior surface of the flexible band and a second terminal edge wound on an inner surface of the flexible band; one or more straps in contact with the exterior surface of the flexible band and running parallel to the flexible band, said one or more straps each having a secured end and a terminal end, wherein the secured end of the one or more straps is affixed to the flexible band; and one or more tightening mechanisms for receiving the terminal end(s) of the strap(s).

17 Claims, 7 Drawing Sheets

(56) References Cited

U.S. PATENT DOCUMENTS

| | | | | | |
|---|---|---|---|---|---|
| 4,545,370 | A | * | 10/1985 | Welsh | A61F 5/028 128/95.1 |
| 4,997,020 | A | * | 3/1991 | Ochoa | B60C 25/14 157/1.21 |
| 5,036,864 | A | * | 8/1991 | Yewer, Jr. | A41F 9/002 128/876 |
| 6,755,799 | B2 | * | 6/2004 | Toda | A61F 5/028 2/311 |
| 8,387,237 | B2 | * | 3/2013 | Huang | B60C 25/00 100/212 |
| 2007/0196780 | A1 | * | 8/2007 | Ware | G09B 19/00 432/262 |

* cited by examiner

APPARATUS FOR SEATING THE BEAD OF A TUBELESS TIRE ONTO A RIM

BACKGROUND

Field of the Invention

The present invention relates to a flexible compression apparatus for seating the bead of a tubeless tire onto a rim and a method of using the apparatus.

Description of the Related Art

The most commonly used tire is the tubeless tire, due to its significant advantages over tube-tires. In a tubeless tire, the tire and the rim form an airtight seal. This allows for gentle deflation if the tire is punctured while the vehicle is in motion. This is advantageous over tube-tires as they are more prone to bursting like a balloon if punctured, which may lead to loss of control of a vehicle.

However, securing a tubeless tire to a rim is more complicated than conventional tube systems and may require more than one person to achieve an airtight seal. One method of seating the bead of the tire on a rim is by igniting ether which is introduced into the tire to produce an explosion. This method is imprecise and can be extremely dangerous to the operator.

A common method for securing these tires is by using tools, such as a Cheetah Bead Seater. However, the Cheetah is a large instrument which is undesirable for an operator as it is heavy and expensive. The Cheetah is a portable bead seater which comprises a tank which is capable of delivering a large volume of highly pressurized air into the cavity of a tubeless tire to seat the bead of a tire to a rim. The Cheetah has a metallic hose that narrows at the output end for fitting between the rim and the bead portion of the tire. As air is pumped into the tire through the valve stem with a tire hose, highly pressurized air is pumped into the tire through the narrow output end of the Cheetah's metallic hose. Thus, air is needed to be pumped into the tire from two different locations.

Other methods for seating a tire on a rim, generally include elastic bands which surround the circumference of the tubeless tire and apply radial pressure. For example, U.S. Pat. No. 2,799,328 discloses a flexible spring metal band that is wrapped around the tire and then is fastened to provide radial pressure to the tire. U.S. Pat. No. 2,908,380 relates to a device for securing a tubeless pneumatic tire on a rim by means of positioning an elastic strip on the outer circumference of a tubeless tire to apply uniformly distributed force. The uniform pressure is used to distort the tire and enable the side walls to flex outwardly to engage the beads to the rim. U.S. Pat. No. 2,859,805 discloses a tube which is wrapped around the tire and its ends are fastened together with lugs. Once the tube is in place, the tube, which is in contact with the outer circumference surface area of the tire, is inflated to provide pressure around the tube. A problem with these methods is the lack of pressure on the entire surface of the tire tread portion of the tire which may make it difficult to consistently form a seal between the tire rim and the bead of the tire.

SUMMARY

In one embodiment, the present invention is a flexible compression apparatus comprising: a circular spiral flexible band having a first terminal edge wound on an exterior surface of the flexible band and a second terminal edge wound on an inner surface of the flexible band; one or more straps in contact with the exterior surface of the flexible band and running parallel to the flexible band, said one or more straps each having a secured end and a terminal end, wherein the secured end of the one or more straps is affixed to the flexible band; and one or more tightening mechanisms for receiving the terminal end(s) of the strap(s).

Another embodiment is directed to a method for seating a bead of a tubeless tire on a rim comprising: inserting the rim in the center hole of the tire; wrapping a flexible compression apparatus around the tire; wherein the flexible compression apparatus comprises: a circular spiral flexible band having a first terminal edge wound on an exterior surface of the flexible band and a second terminal edge wound on an inner surface of the flexible band; one or more straps in contact with the exterior surface of the flexible band and running parallel to the flexible band, said one or more straps each having a secured end and terminal end, wherein the secured end of the one or more straps is affixed to the flexible band; and one or more tightening mechanisms for receiving the terminal end(s) of the strap(s); tightening the flexible band with the tightening mechanism(s) by drawing on the strap(s) so as to shorten the length of the strap(s) between the secured end(s) of the strap(s) and the tightening mechanism(s); wherein tightening the one or more straps around the flexible band provides an inward radial pressure on the tread of the tubeless tire; and inflating the tubeless tire.

In each of the foregoing embodiments, the tightening mechanism may be a clamp comprising a ratchet mechanism for receiving the terminal end of the strap and for drawing on the strap so as to shorten the distance between the secured end of the strap and the ratchet mechanism.

In each of the foregoing embodiments, the ratchet mechanism may allow rotary motion in only one direction.

In each of the foregoing embodiments, the tightening mechanism may be a motorized clamp for receiving the terminal end of the strap and for drawing on the strap so as to shorten the distance between the secured end of the strap and the motorized clamp.

In each of the foregoing embodiments, the secured end of the one or more straps may be affixed to the flexible band with a plate.

In each of the foregoing embodiments, the flexible band may comprise at least three flexible fasteners for securing the straps to the flexible band.

In each of the foregoing embodiments, the fasteners may allow for the straps to move parallel to the flexible band.

In each of the foregoing embodiments, the flexible band may be a plastic material, such as high-density polyethylene, low-density polyethylene, polypropylene, polyvinyl chloride, polystyrene.

In each of the foregoing embodiments, the apparatus may comprise at least 2 straps, or 2 to 5 straps or 3 to 5 straps.

In each of the foregoing embodiments, the apparatus may have a corresponding number of straps to tightening mechanisms. In each of the foregoing embodiments, the apparatus may have a tightening mechanism which can accommodate more than one strap.

In each of the foregoing embodiments, the tubeless tire may be a passenger vehicle tire or a light truck (up to 14000 lb truck) tire or a medium duty truck (14001-26000 lb truck) tire or a heavy duty truck (26001 lb or greater) tire.

In each of the foregoing embodiments, the inflating of the tubeless tire may be performed through a valve stem in the rim.

BRIEF DESCRIPTION OF THE DRAWINGS

Embodiments of the invention will become more fully apparent from the following detailed description, the appended claims, and the accompany drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," comprising," "includes," and/or "including," specify the presence of stated features, steps, or components, but do not preclude the presence or addition of one or more other features steps or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
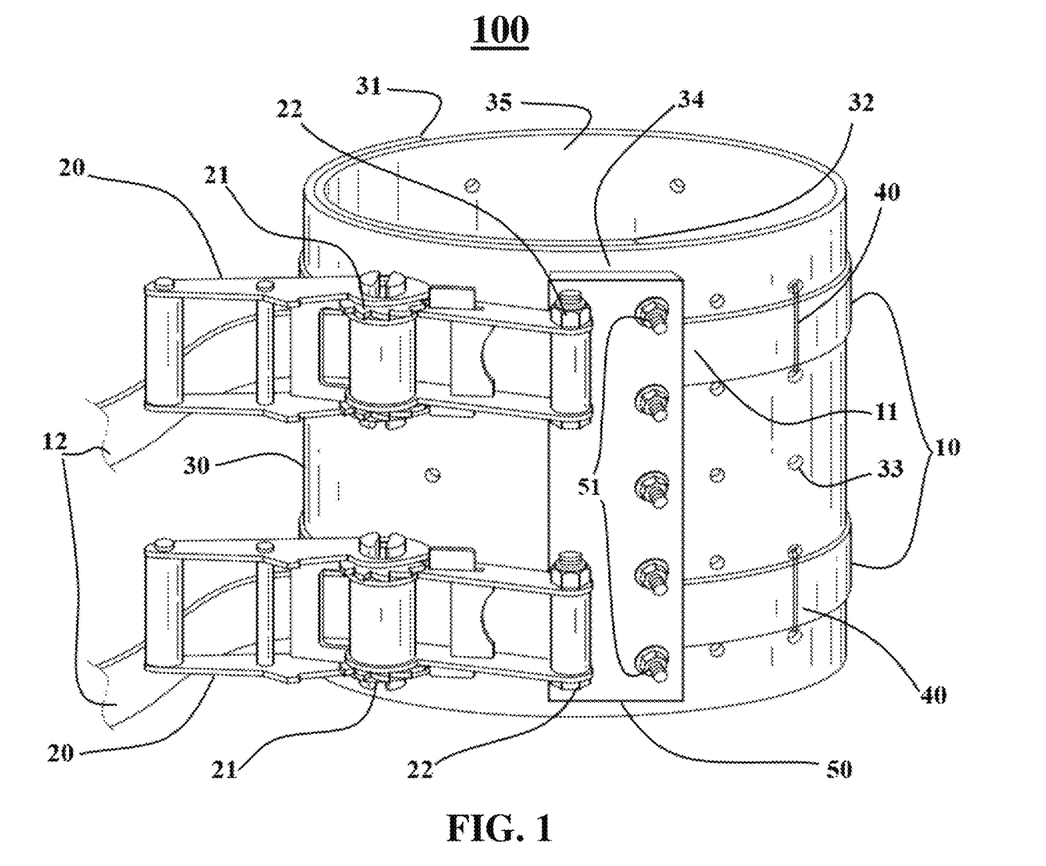
FIG. 1 is an isometric view of the present invention according to one embodiment of the present disclosure.
Figure 2:
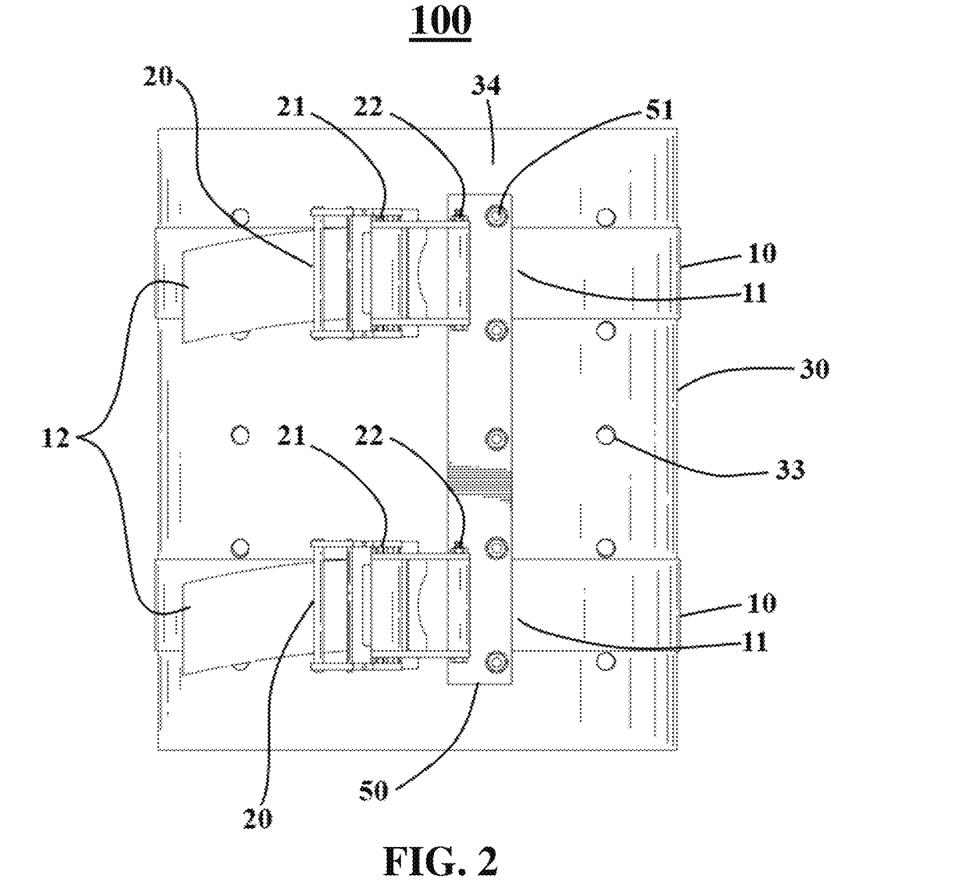
FIG. 2 is a front view of FIG. 1.
Figure 3:
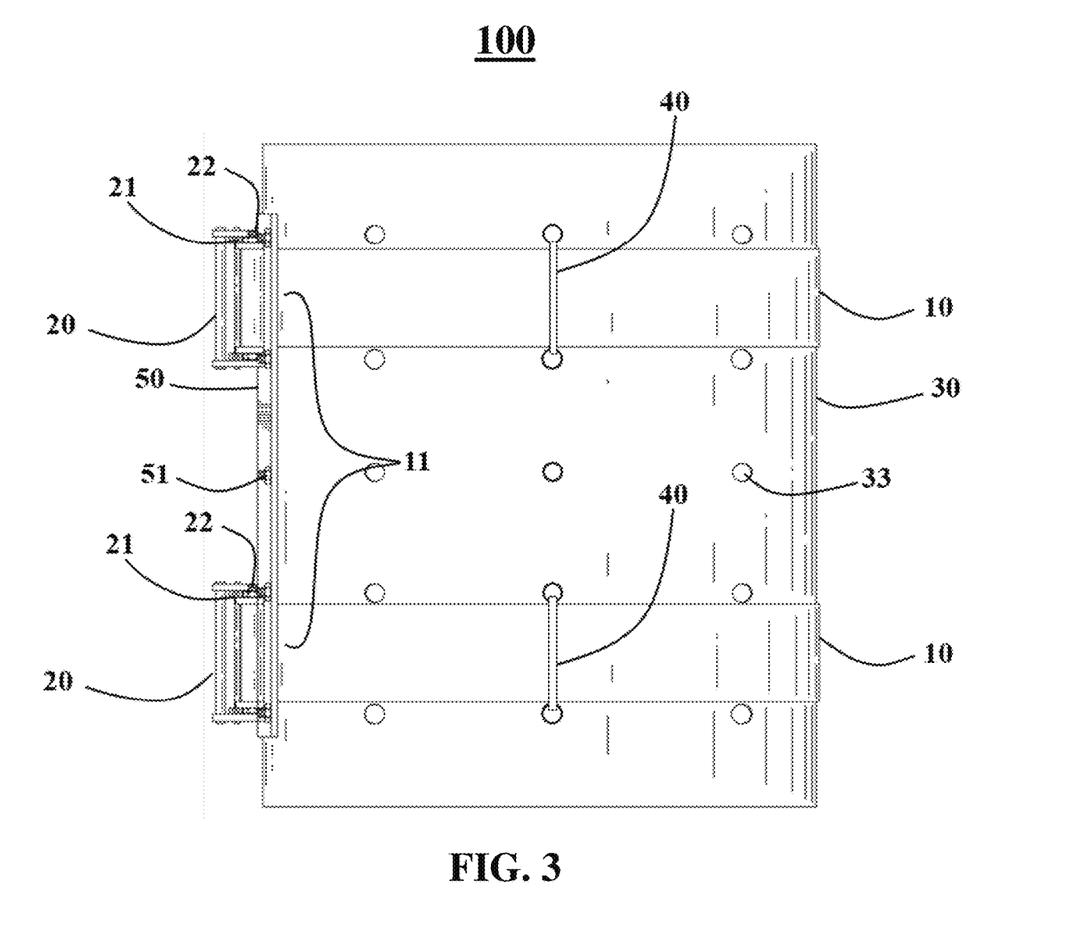
FIG. 3 is a side view of FIG. 1.
Figure 4:
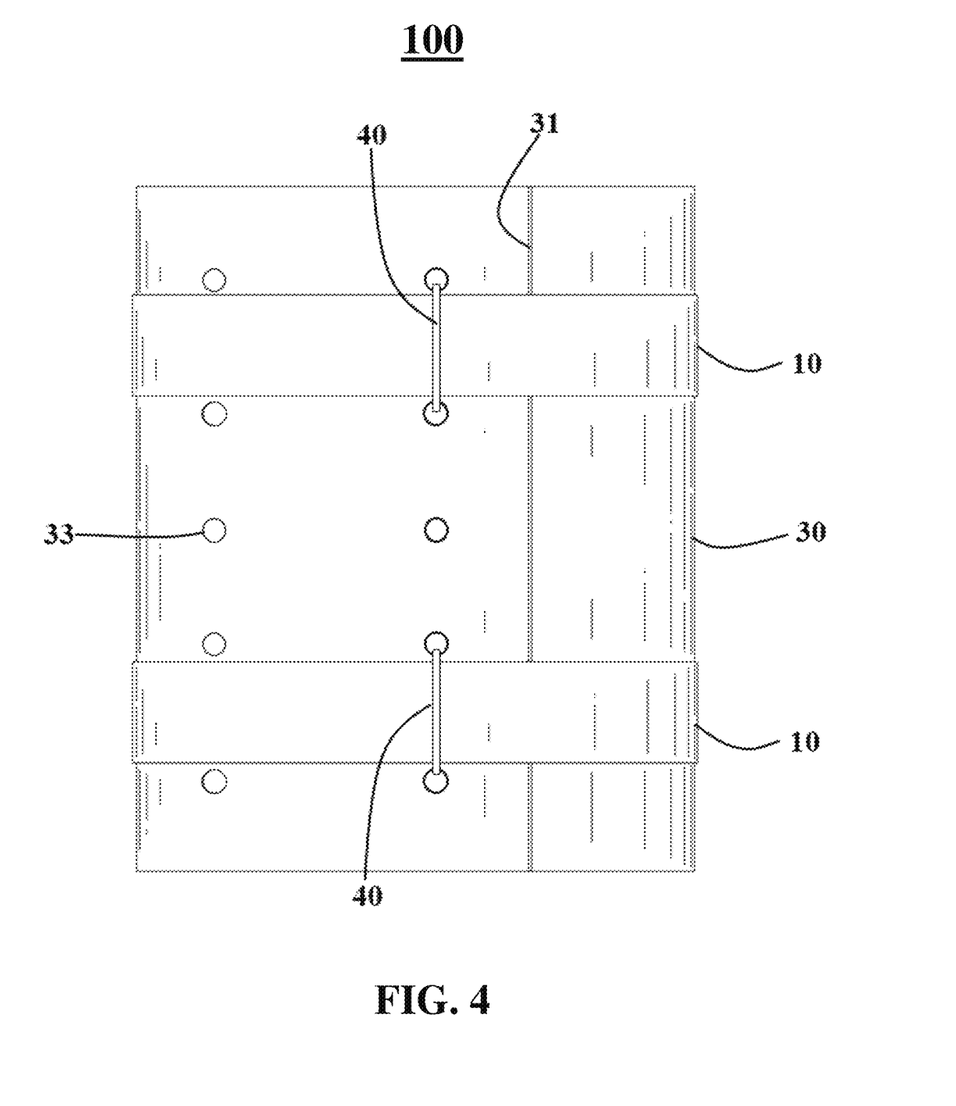
FIG. 4 is a back view of FIG. 1.
Figure 5:
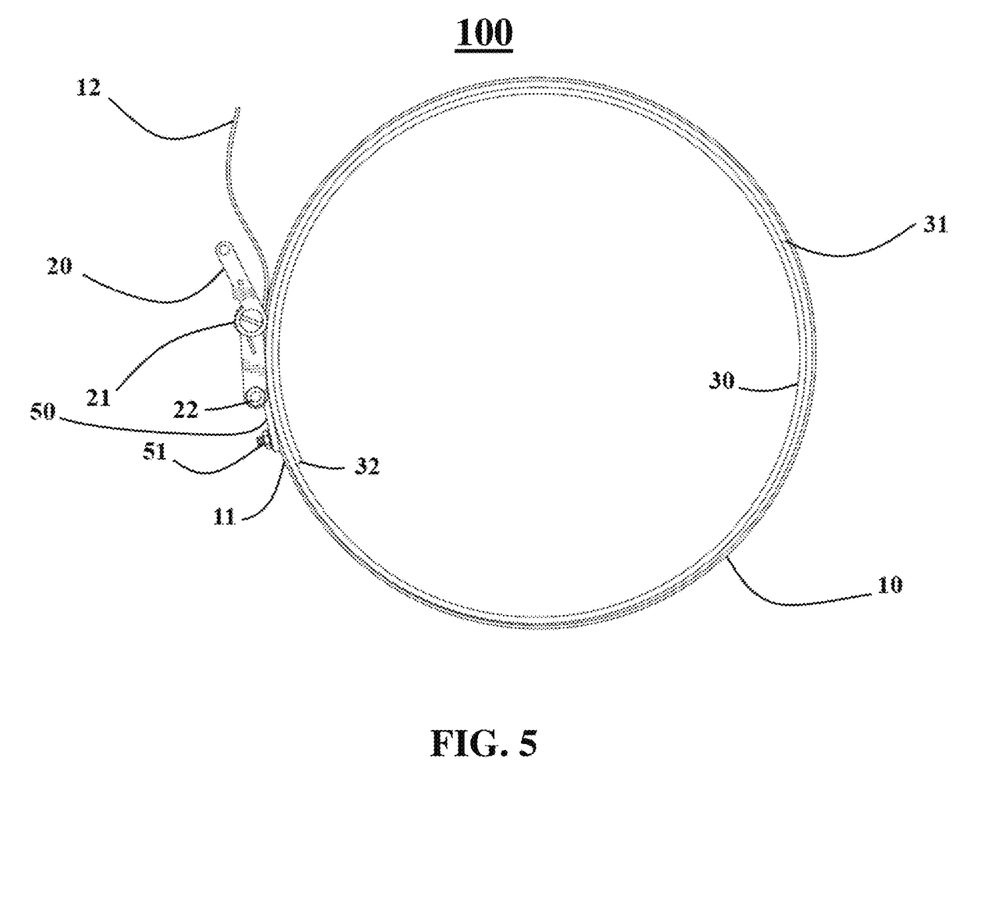
FIG. 5 is a top view of FIG. 1.
Figure 6:
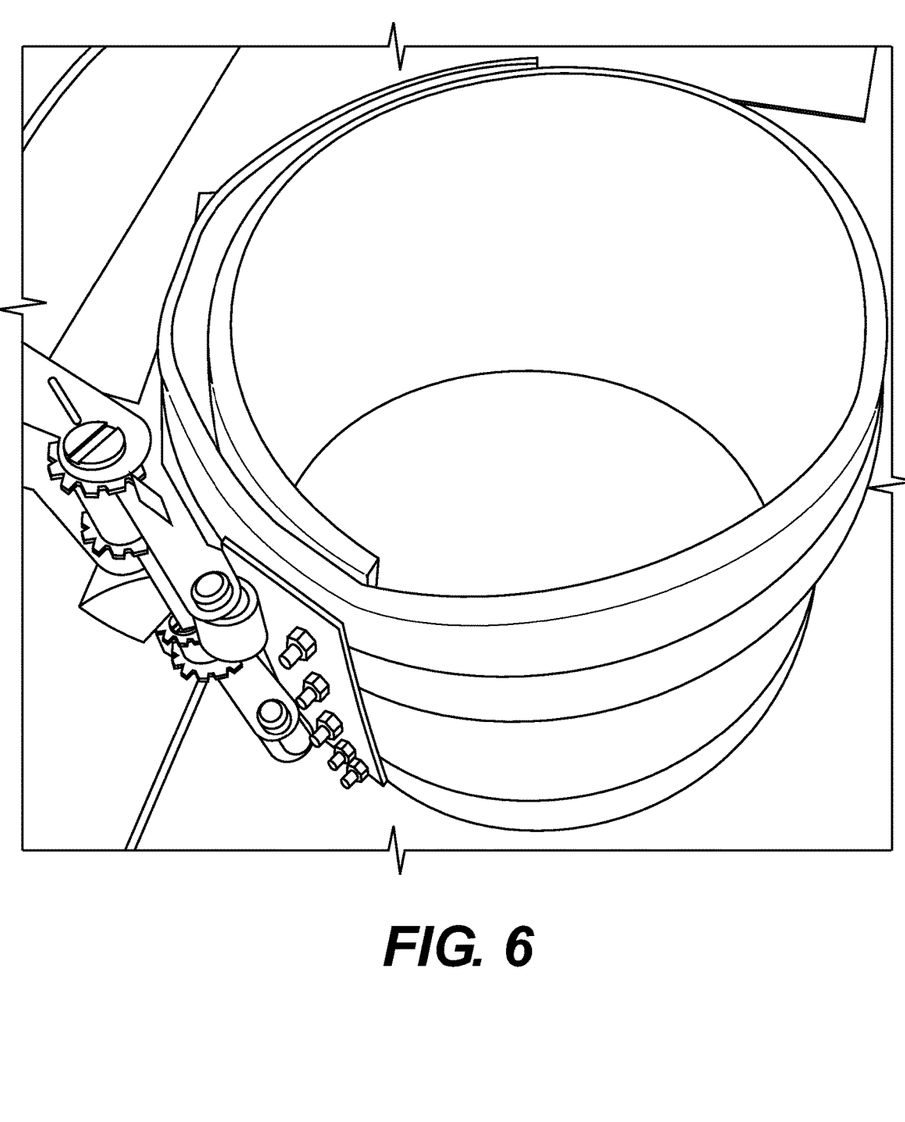
FIG. 6 is a photograph of a top view of a second embodiment of the present disclosure.
Figure 7:
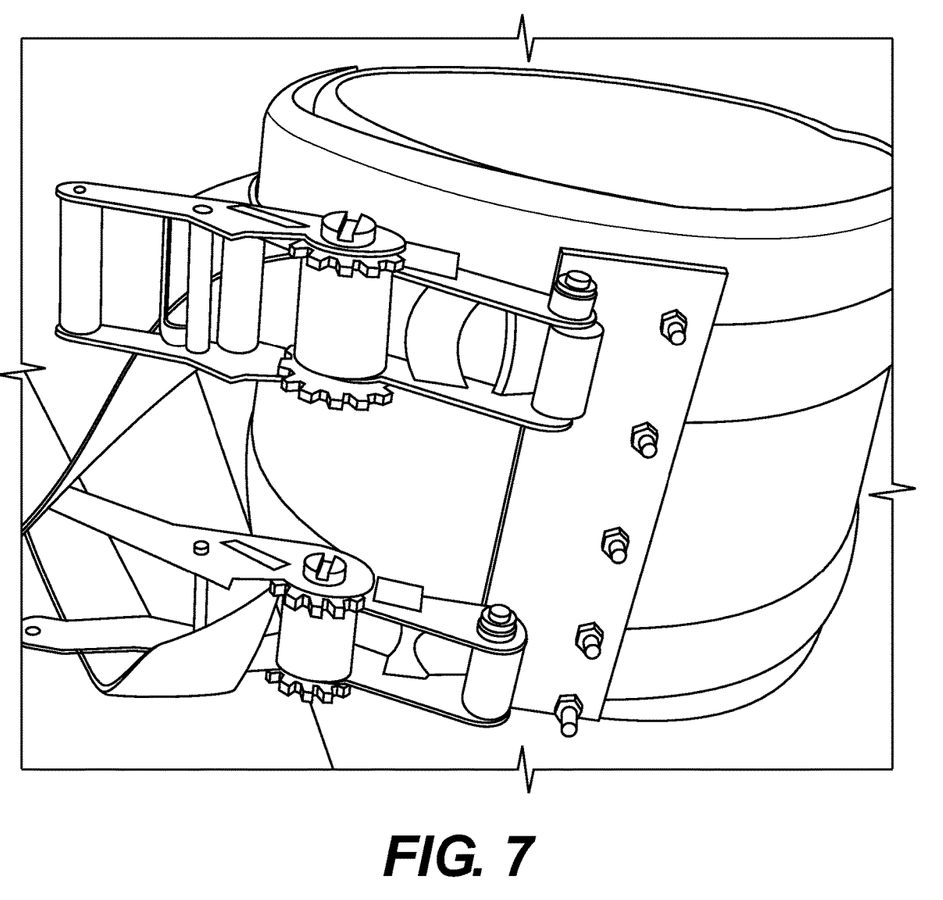
FIG. 7 is a photograph of a side view of the FIG. 6.

FIG. 1 is an isometric view of a flexible compression apparatus 100 according to one embodiment of the present disclosure. FIG. 2 is a front view of the flexible compression apparatus 100, FIG. 3 is a side view of the flexible compression apparatus 100, and FIG. 4 is a back view of the flexible compression apparatus 100. FIG. 5 is a top view of the flexible compression apparatus. The flexible compression apparatus 100 has strap 10, a clamp 20, a flexible band 30, and a plate 50.

The flexible band 30, which is a flexible material that is preferably a solid flexible plastic material, is designed to be encircled around a tubeless tire (not shown) and secured with straps 10 to apply even pressure inwardly in a radial direction toward the center of the tire as the tire is inflated through the tire valve in the rim. As shown from the top view of FIG. 4, the flexible band 30 is generally circular in shape and is of sufficient length so as to circle in on itself forming a spiral so that a first terminal edge 31 of the flexible band 30 wraps around and past a second terminal edge 32 of the flexible band 30. Preferably, the length of the flexible band 30 is between 1.05-1.75 times the circumference of the circle made by the flexible band 30. More preferably, the length of the flexible band 30 is between 1.1-1.6 times the circumference of the circle made by the flexible band 30. The flexible band of the present invention is suitable for wrapping around smaller tires, such as wheelbarrow tires, with an outer circumference of around 35 inches, and much larger tires, such as truck tires with outer circumferences of over 71 inches. The flexible band may be capable of wrapping around a tubeless tire with an outer circumference of about 15 inches to about 150 inches, or more preferably from 25 to 100 inches, or about 45 to 75 inches.

In an embodiment, the flexible band 30 comprises a plate 50 which is affixed to a medial portion 34 of the exterior surface of the band 30 by means of fasteners 51. The flexible band 30 comprises one or more straps 10, preferably two straps, which run parallel to each other and each comprises a secured end 11 and a terminal end 12. The straps 10 are optionally secured to the flexible band 30 by means of flexible fasteners 40, such as wires or cable zip ties. As seen by FIG. 1-4, the flexible band 30 can optionally comprise holes 33 which provides locations to secure the straps 10 by flexible fasteners 40 to the flexible band 30. The holes 33 may have a diameter of about 1/32 inch to 1 inch to accommodate flexible fasteners 40 of varying load capacities. In preferred embodiments, the holes 33 have a diameter of 1/16 inch to 3/4 inch, or about 3/8 inch. The straps 10 can be secured to the flexible band 30 by the flexible fasteners 40 in one or more locations, preferably each strap 10 is secured in at least three locations to the flexible band 30.

During operation, the clamp 20 can shorten the length of the strap 10 with the unbeaded tire and rim contained within the flexible band 30. As the strap 10 shortens, the spiral constricts by sliding the second terminal edge 32 along the inner surface 35 of the flexible band 30 thereby reducing the diameter of the circular flexible band 30 so as to apply pressure inwardly on the outer surface (the tire tread portion) of the tire in a radial direction toward the center of the tire. The clamp 20 also can hold the strap in place during inflation. In an embodiment, the clamp 20 comprises a ratchet mechanism 21 which receives the terminal end 12 of the strap 10. The clamp 20 can be affixed to the plate 50 by clamp fasteners 22. The ratchet mechanism 21 comprises a round gear with asymmetrical teeth and a pin which engages with the teeth. The teeth generally have two sides, one with a sharp angle with respect to the center of the gear, and a second with moderate angle, which allows for the pin to slide unrestricted when the clamp 20 is cranked. When the gear moves in the opposite direction, the pin will catch against the sharp angle preventing the gear from moving. This ensures that the clamp 20 only allows for rotary motion in one direction, when tightening the straps 10. The clamp 20 also comprises a release mechanism to release the terminal end 12 of the strap 10 upon completion of the beading of the tire to the rim. Further, the ratchet mechanism may comprise a winding shaft for wrapping excess straps by means of using the same motion as tightening the straps of the apparatus. In some embodiments, the flexible compression apparatus may have at least two clamps and at least two straps. In another embodiment, the flexible compression apparatus may have at least three clamps and at least three straps.

Note that the tightening mechanism of the present invention is not limited to a clamp including a ratchet mechanism that usually requires more than one hand cranking action to tighten the flexible band to the appropriate circumference. The tightening mechanism can be any device capable of receiving the terminal end 12 of the strap 10 and capable of tightening the strap 10 to provide tension to the strap 10 and inward radial pressure to the flexible band. In alternative embodiments, the tightening mechanism may be motorized to automatically tighten the straps to apply a set radial pressure inwardly toward the center of a tubeless tire.

Note that the front view of FIG. 2 shows that the straps 10 completely wrap around the flexible band 30 and to engage with the clamps 20.

The flexible band 30 of the present disclosure is primarily, if not entirely, made of a suitable plastic, such as high-density polyethylene, low density polyethylene, polypropylene, polyvinyl chloride, polystyrene, and may be manufactured using suitable techniques for manufacturing plastics, such as compression molding, extrusion molding and injection molding. The flexible band 30 can be manufactured from a hollow cylinder, such as a long tube or pipe. These long tubes or pipes have diameters greater than that of the desired tire to be seated. The circumference of the long tubes or pipes can be between 1.05-1.75 times the circumference of the tire to be seated. More preferably, the long tubes or pipes have a circumference between 1.1-1.6 times the circumference of the tire to be seated. The tube or pipe can be first cut perpendicularly to the length of the tube, so as to provide a piece of the tube or pipe having a length which is preferably 0.95-1.2 times the width of the tread of the tire to be seated. More preferably, the piece of the tube or pipe is cut to a length which is 1-1.1 times the width of the tire to be seated. In certain embodiments, the piece of the tube or pipe is cut to a length which is slightly longer than the width of the tire to be seated so as to have extra material capable of forming a lip to hold the tire within the flexible band. A second cut can be made which is parallel to the length of the piece of tube or pipe, so that the newly cut edges become the first terminal edge and the second terminal edge, respectively of the flexible band. By starting with a tube or pipe having a diameter which is greater than the circumference of the tire to be seated, the flexible band is long enough to form a spiral shape, i.e., to have the first terminal edge wound on an exterior surface of the flexible band and the second terminal edge wound on an inner surface of the flexible band.

In preferred embodiments, the flexible band 30 is not an elastomeric material. Elastic materials are more susceptible to wear and tear and results in a shorter life span than plastic materials. The flexible band should have a thickness of at least $1/32$ inch to 1 inch, or at least $1/16$ inch to $3/4$ inch, or about $1/8$ inch to about $3/8$ inch. The flexible band preferably has a thickness from $1/32$ of an inch to $1/8$ of an inch for smaller tires and from $1/8$ of an inch to at least $3/8$ of an inch for commercial use tires. The flexible band 30 of the present invention is preferably a smooth rectangular shape (if opened up and pressed to be flat), optionally with rounded corners, to provide sufficient area for contact between the band and the tread of a tubeless tire. Preferably, the width of the flexible band 30 is of equal or greater in size with respect to the width of the tubeless tire to be seated. In preferred embodiments, the width of the flexible band is preferably about 5 inches to about 25 inches. Even more preferably, the width of the flexible band 30 is between 7 to 20 inches. Most preferably, the width of the flexible band 30 is between 10 to about 12 inches. Also, the length of the band is preferably greater in size than the circumference of the tubeless tire to be seated. In addition, the outer edges of the length of the flexible band 30 may be bent inwardly to form a lip which aids in keeping the tire in place during operation.

The plate 50 of the present disclosure is preferably a durable and heavy duty material capable of withstanding pressure and load, such as a metal plate having a thickness of $1/64$ inch to 1 inch. Preferably, the plate 50 has a thickness of $1/16$ inch to $1/2$ inch. More preferably, the metal plate has a thickness of about $1/8$ of an inch. The metal plate comprises an attachment site for clamp fasteners 22 to hold the clamp 20 to the flexible band 30. Also, the plate secures the secured end 11 of the strap 10 to the flexible band 30 by fasteners 51. Preferably, the length of the plate 50 is approximately 80-105% the size with respect to the width of the flexible band 30 to prevent possible deformation and deterioration of the flexible band 30. More preferably, the length of the plate 50 is approximately 95% the size with respect to the width of the flexible band 30. In some embodiments, the length of the plate is between $4\frac{7}{8}$ inches to $24\frac{7}{8}$ inches, or more preferably from $6\frac{7}{8}$ inches to $19\frac{7}{8}$ inches, or about $11\frac{7}{8}$ inches. Preferably, the width of the plate 50 is from $1/2$ inch to 6 inches. More preferably, the width of plate 50 is from 1 to 5 inches, or about 3 inches. There is no limit on the number of fasteners 51 but there should be a sufficient number to keep the plate 50 securely attached to the flexible band 30. Preferably there are 2 or more, or 4 to 6 fasteners 51 spaced apart on the plate 50. The fasteners 51 can be bolts, screws or the like.

The one or more tightening mechanisms may be either fastened or unfastened to the flexible band 30. It is preferred that the one or more tightening mechanisms be fastened to the flexible band 30 either directly or by being affixed to the plate 50, and more preferably the one or more tightening mechanisms are fastened to the flexible band 30 indirectly by being affixed to the plate 50.

Herein, the term "strap" is used to encompass any flexible line having sufficient strength so as not to break as the line is drawn tighter and presses the flexible band to the tread of the tire. The term "strap" may include ratchet straps, nylon webbing, cords, braided cords, wires, cables, bungee cords, chains or rope. Other non-limiting materials suitable for the straps may include belts of leather or rubber. The strap can be a woven fabrics made of cotton, flax or synthetic fibers such as nylon, polypropylene or polyester, wherein the fibers have varying widths or diameters. The straps 10 are preferably from about $1/32$ inch to about 5 inch in width and capable of handling tension. In other preferred embodiments, the straps preferably have a width of about $1/2$ inch to about 4 inches, or about 2 inches. Preferably, the length of the straps 10 is between 1.13-1.75 times the circumference of the tire. More preferably, the length of the straps 10 is between 1.25-1.6 times the circumference of the tire. In preferred embodiments, the length of the straps is from 20 to 175 inches, or from 40 to 150 inches. More preferably, the length of the straps is about 85 inches. In an embodiment of the invention (not shown in the figures), the clamps 20 are fastened directly to the flexible band 30 with clamp fasteners 22, and the secured end 11 of the straps 10 is secured to the flexible band 30 simply with an adhesive and optionally with a combination of adhesive and the plate 50 without fasteners 51. In a preferred embodiment, the clamps 20 are fastened to the plate 50 with clamp fasteners 22, and the secured end 11 of the straps 10 are held in place on the flexible band 30 with the plate 50. Preferably, the plate 50 holds the secure end 11 of the straps by tightening of the fasteners 51. The fasteners 51 are of sufficient length to allow insertion and/or removal of the straps 10 from between the plate 50 and the flexible band 30 when the straps are not yet fully secured. Optionally, an adhesive is also used with the plate 50 and fasteners 51 to hold the secured end 11 of the straps 10 to the flexible band 30.

In an embodiment, the present invention provides a method for seating a bead of a tubeless tire on a rim comprising: inserting the rim in the center hole of the tire; wrapping a flexible compression apparatus 100 around the tire, wherein the flexible compression apparatus 100 comprises: a circular spiral flexible band 30 having a first terminal edge 31 wound on an exterior surface of the flexible band 30 and a second terminal edge 32 wound on an inner surface 35 of the flexible band 30; one or more straps 10 in contact with the exterior surface of the flexible band 30 and running parallel to the flexible band 30, said one or more straps 10 each having a secured end 11 and terminal end 12, wherein the secured end 11 of the one or more straps 10 is affixed to the flexible band 30; wherein each of the one or more straps 10 having a tightening mechanism for receiving the terminal end 12 of the strap 10; tightening the flexible band 30 by means of the tightening mechanism, wherein tightening the one or more strap(s) 10 around the flexible band 30 provides an inward radial pressure against the tire tread; and inflating the tubeless tire.

In the foregoing embodiment, the tightening mechanism may be a clamp comprising a ratchet mechanism for receiving the terminal end of the strap and for drawing on the strap so as to shorten the distance between the secured end of the strap and the ratchet mechanism. In the foregoing embodiment, the ratchet mechanism allows rotary motion in only one direction.

The flexible compression apparatus 100 of the present disclosure is suitable for seating the bead of a tubeless tire on a rim of a wheelbarrow tires, lawn mower tires, all-terrain vehicle (ATV) tires, trailer tires, cart tires, tractor tires, passenger car tires and light trucks. The present invention is suitable for seating the bead of a tubeless tire for homeowners and commercial use. In another embodiment, the flexible compression apparatus 100 is suitable for seating the bead of a tubeless tire on a rim of a heavy duty truck tire and comprises at least three clamps and at least three straps.

In one possible implementation, the flexible compression apparatus 100 has the following dimensions:
 Length of the flexible band 30=15 to 150 inches, or 25 to 100 inches or about 45 to 75 inches;
 Width of the flexible band 30=5 to 25 inches, or 7 to 20 inches or 10 to about 12 inches;
 Thickness of the flexible band 30=$\frac{1}{32}$ to 1 inch, or $\frac{1}{16}$ to $\frac{3}{4}$ inch, or about $\frac{1}{8}$ inch to about $\frac{3}{8}$ inch;
 Length of the straps 10=20 to 175 inches, or 40 to 150 inches or about 85 inches;
 Width of the straps 10=$\frac{1}{32}$ to 5 inches, or $\frac{1}{2}$ to 4 inches or about 2 inches;
 Diameter of the holes 33=$\frac{1}{32}$ to 1 inch, or $\frac{1}{16}$ to $\frac{3}{4}$ inch or about $\frac{3}{8}$ inch;
 Length of plate 50=$4\frac{7}{8}$ to $24\frac{7}{8}$ inches, or $6\frac{7}{8}$ to $19\frac{7}{8}$ inches or about $11\frac{7}{8}$ inches;
 Width of plate 50=$\frac{1}{2}$ to 6 inches, 1 to 5 inches or about 3 inches; and
 Thickness of plate 50=$\frac{1}{64}$ to 1 inch, $\frac{1}{16}$ to $\frac{1}{2}$ inch, or about $\frac{1}{8}$ inch. Those skilled in the art will understand that these dimensions are merely illustrative of one particular implementation of the invention, and that other implementations may have one or more different dimensions. Note that, in alternative embodiments, the flexible compression apparatus may have additional straps and clamps. Also, in other embodiments the flexible compression apparatus may have flexible bands and straps with larger widths and lengths for seating various sized tubeless-tires.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps, when used with the open-ended term "comprising," the recitation of the term "each does not exclude additional, unrecited elements or steps. Thus, it will be understood that an apparatus may have additional, unrecited elements and a method may have additional, unrecited steps, where the additional, unrecited elements or steps do not have the one or more specified characteristics.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation".

What is claimed is:

1. A flexible compression apparatus comprising:
 a circular spiral flexible band having a first terminal edge wound on an exterior surface of the flexible band and a second terminal edge wound on an inner surface of the flexible band;
 one or more straps in contact with the exterior surface of the flexible band and running parallel to the flexible band, said one or more straps each having a secured end and a terminal end, wherein the secured end of the one or more straps is affixed to the flexible band; and
 one or more clamps comprising one or more ratchet mechanisms for receiving the terminal end(s) of the strap(s) and for drawing on the strap so as to shorten the distance between the secured end of each said strap and each said ratchet mechanism.

2. The flexible compression apparatus of claim 1, wherein the ratchet mechanism allows rotary motion in only one direction.

3. The flexible compression apparatus of claim 1, wherein each said clamp is a motorized clamp for receiving the terminal end of the strap and for drawing on the strap so as to shorten the distance between the secured end of the strap and the motorized clamp.

4. The flexible compression apparatus of claim 1, wherein the flexible band comprises at least three flexible fasteners for securing the straps to the flexible band.

5. The flexible compression apparatus as claimed in claim 4, wherein the fasteners allow for the straps to move parallel to the flexible band.

6. The flexible compression apparatus of claim 1, wherein the flexible band is a plastic material, such as high-density polyethylene, low-density polyethylene, polypropylene, polyvinyl chloride, polystyrene.

7. The flexible compression apparatus of claim 1, comprising at least two straps.

8. The flexible compression apparatus of claim 1, wherein the apparatus has more than one strap, and each clamp receives one of the respective terminal ends of each said strap and draws on the more than one strap so as to shorten the distance between the secured ends of each strap and the clamp.

9. A flexible compression apparatus comprising:
a circular spiral flexible band having a first terminal edge wound on an exterior surface of the flexible band and a second terminal edge wound on an inner surface of the flexible band;
one or more straps in contact with the exterior surface of the flexible band and running parallel to the flexible band, said one or more straps each having a secured end and a terminal end, wherein the secured end of the one or more straps is affixed to the flexible band; and
one or more tightening mechanisms for receiving the terminal ends of the strap(s), wherein the secured end of the one or more straps is affixed to the flexible band with a plate.

10. A method for seating a bead of a tubeless tire on a rim comprising:
inserting the rim in the center hole of the tire;
wrapping a flexible compression apparatus around the tire;
wherein the flexible compression apparatus comprises:
a circular spiral flexible band having a first terminal edge wound on an exterior surface of the flexible band and a second terminal edge wound on an inner surface of the flexible band;
one or more straps in contact with the exterior surface of the flexible band and running parallel to the flexible band, said one or more straps each having a secured end and terminal end, wherein the secured end of the one or more straps is affixed to the flexible band;
and one or more clamp(s) for receiving the terminal end(s) of the strap(s), the one or more clamp(s) each comprising a ratchet mechanism for receiving the terminal end of the strap and for drawing on the strap so as to shorten the distance between the secured end of the strap and the ratchet mechanism;
tightening the flexible band with the clamp(s) by drawing on the strap(s) so as to shorten the length of the strap(s) between the secured end(s) of the strap(s) and the clamp(s);
wherein tightening the one or more straps around the flexible band provides an inward radial pressure on the tread of the tubeless tire; and inflating the tubeless tire.

11. The method of claim 10, wherein the ratchet mechanism allows rotary motion in only one direction.

12. The method of claim 10, wherein each said clamp is a motorized clamp for receiving the terminal end of the strap and drawing on the strap so as to shorten the distance between the secured end of the strap and the motorized clamp.

13. The method of claim 10, wherein the tubeless tire is a passenger vehicle tire and comprises at least two straps.

14. The method of claim 10, wherein the tubeless tire is a light truck tire and comprises at least two clamps and a corresponding number of straps.

15. The method of claim 10, wherein the tubeless tire is a heavy duty truck tire and comprises at least three clamps and a corresponding number of straps.

16. The method of claim 10, wherein the apparatus has more than one strap, and each said clamp receives one of the respective terminal ends of each said strap and draws on the strap so as to shorten the distance between the secured ends of each strap and the clamp.

17. The method of claim 10, wherein the inflating of the tubeless tire is performed through a valve stem in the rim.

* * * * *